Figures 1, 2:

No. 791,749. PATENTED JUNE 6, 1905.
J. B. CHAMBERLAIN.
MATCH STRIKER.
APPLICATION FILED MAY 28, 1904.

Witnesses
J. M. Fowler, Jr.
J. C. Veatch

Inventor
Joseph B. Chamberlain
By Wallace Greene,
Attorney.

No. 791,749.

Patented June 6, 1905.

UNITED STATES PATENT OFFICE.

JOSEPH B. CHAMBERLAIN, OF PHILADELPHIA, PENNSYLVANIA.

MATCH-STRIKER.

SPECIFICATION forming part of Letters Patent No. 791,749, dated June 6, 1905.

Application filed May 28, 1904. Serial No. 210,292.

*To all whom it may concern:*

Be it known that I, JOSEPH B. CHAMBERLAIN, a citizen of the United States, residing at Philadelphia, in the county of Philadelphia and State of Pennsylvania, have invented new and useful Improvements in Match-Strikers, of which the following is a specification.

The object of this invention is to avoid the use of disagreeably-conspicuous match strikers or scratchers, usually found necessary wherever matches are frequently lighted to save the walls or furniture from disfiguring-marks.

The invention involves covering a picture, figure, printed matter, or the like with transparent material not readily affected by scratching matches thereon and by providing a match-igniting surface upon such material. Usually the object covered is a picture and the ignition area is directly over some element of the same, which may properly have the appearance given by the ignition-surface having the given element beneath it. Preferably the composition element of the picture is an element which is or which may be made by added pigment upon the covering, for example, so dark that the trace of a match upon the covering over the same may be inconspicuous or indistinguishable. Almost any picture or printed sheet lends itself to the purposes of this invention, and the covering may be secured in proper relation to the same by integral union, by direct adhesion, by cement, by a frame or other mechanical device, or by any suitable means whatever.

In the drawings, Figure 1 shows a match-striker involving my invention. Fig. 2 is a section on the line 2 2, Fig. 1.

In the drawings, A represents a sheet of suitable material, bearing in this instance a picture of an Indian chief, B a plane plate of glass serving to illustrate a transparent covering, and C a binding-strip holding the sheet and plate together. That portion D of the glass which lies directly over the representation of a sort of tunic worn by the chief is given a match-igniting surface, while the rest of the glass is left smooth. This igniting-surface may be produced by grinding or otherwise roughening the glass or by giving it a coating of suitable material, and, if desired, coloring-matter may be applied upon either face of the ignition area to render the match-marks inconspicuous. Matches leave no mark upon the smooth surface of the glass, and the marks, if any be visible, upon the ignition-surface may be readily sponged off.

For the purposes of this invention printed matter or any representation, whether in relief or not, of figures, scenes, or characters are like pictures so long as they may be covered with transparent material having match-igniting areas, and the phrase "picture or the like" used in the following claims includes all such things.

What I claim is—

1. As a new article of manufacture, a picture or the like provided with a covering of transparent material having as a part of its surface a roughened, match-igniting area coextensive with and covering a picture element or feature which may properly have the appearance presented by such area; whereby the ignition area is made inconspicuous.

2. As a new article of manufacture, a glass plate having on its back a suitable picture to be viewed through the plate and upon its front a roughened, match-igniting area registering or corresponding with a distinct feature of the picture; whereby the eye ascribes the appearance of that portion of the picture entirely to the picture itself and fails to notice the roughening.

In testimony whereof I have signed this specification in the presence of two subscribing witnesses.

JOSEPH B. CHAMBERLAIN.

Witnesses:
 JOHN G. FRYER,
 ORLANDO S. COBOURN.